United States Patent [19]

Bowen et al.

[11] Patent Number: 4,991,929
[45] Date of Patent: Feb. 12, 1991

[54] INDEX MATCHING FILM

[75] Inventors: Terry P. Bowen, Etters; Paul R. Reitz, Tannenbaum, both of Pa.

[73] Assignee: AMP Incorporated, Harrisburg, Pa.

[21] Appl. No.: 476,219

[22] Filed: Feb. 7, 1990

Related U.S. Application Data

[63] Continuation-in-part of Ser. No. 351,684, May 12, 1989, abandoned.

[51] Int. Cl.$^5$ ............................................. G02B 6/38
[52] U.S. Cl. ................................................. 350/96.21
[58] Field of Search ............... 350/96.15, 96.20, 96.21, 350/96.22

[56] References Cited

U.S. PATENT DOCUMENTS

| | | | |
|---|---|---|---|
| 3,963,323 | 6/1976 | Arnold | 350/96 C |
| 4,045,120 | 8/1979 | Corlieu et al. | 350/96 C |
| 4,212,514 | 7/1980 | Prunier et al. | 350/96.21 |
| 4,221,461 | 9/1980 | Blair | 350/96.20 |
| 4,431,262 | 2/1984 | Tolles | 350/96.15 |
| 4,432,603 | 2/1984 | Morency et al. | 350/96.21 |
| 4,512,630 | 4/1985 | Runge | 350/96.21 |
| 4,634,214 | 1/1987 | Cannon et al. | 350/96.20 |
| 4,878,730 | 11/1989 | Wall | 350/96.21 |

*Primary Examiner*—John D. Lee

[57] ABSTRACT

The present invention provides an optical fiber connector comprising a connector receptacle, a mechanism associated with the connector receptacle for optically coupling two optical fibers together, and a compliant index matching film material positioned within the connector receptacle. When the optical fibers are inserted into the connector receptacle for optical coupling, the end faces of each of the optical fibers are in physical contact with the film material. Preferably, the connector is of the ferrule type, i.e., the optical fibers are located inside ferrules which are received and aligned within the connector receptacle so that the optical fibers are optically coupled together. A bayonet or threaded locking mechanism is associated with the connector receptacle and the ferrules for locking them into place within the connector receptacle.

20 Claims, 4 Drawing Sheets

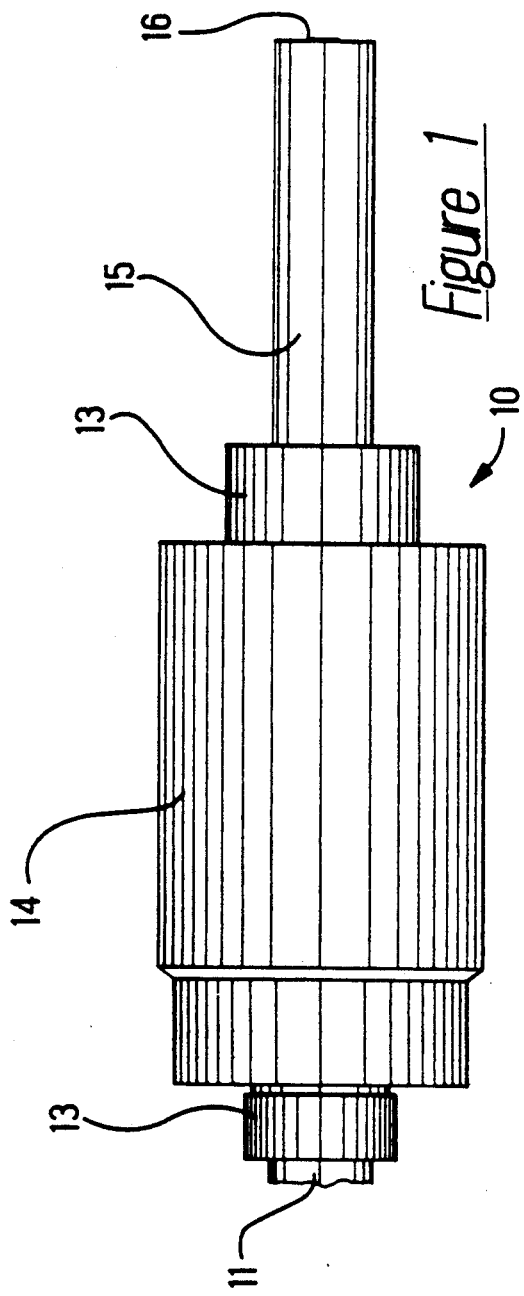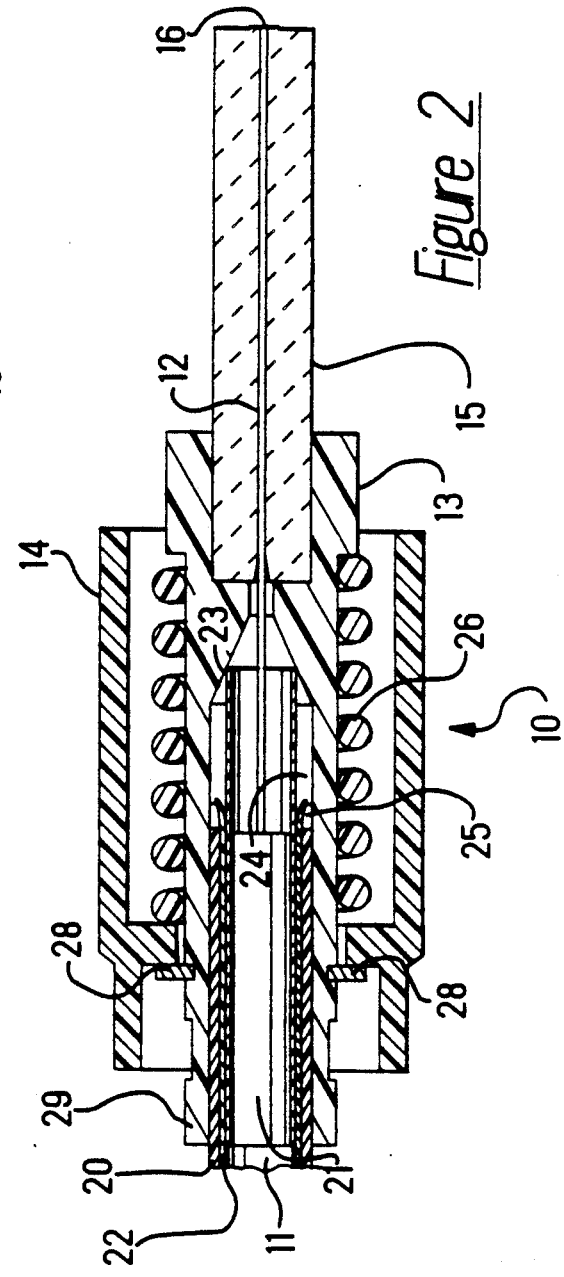

INDEX MATCHING FILM

CROSS REFERENCE TO RELATED APPLICATION

This application is a continuation in part of application Ser. No. 07/351,684 filed May 12, 1989, abandoned.

BACKGROUND OF THE INVENTION

The invention relates to a connector having a film located in an interior region. More particularly, the invention relates to a connector wherein an index matching film is positioned between the end faces of two optical fibers optically coupling the two fibers together.

In recent years, electro-optical equipment has begun to replace electronic equipment for certain applications, for example, for telecommunications networks. This trend is expected to continue because of the inherent advantages that electro-optical equipment has over electronic equipment for these kinds of applications. In order to interconnect various pieces of electro-optical equipment, fiber optic cables are used. The fiber optic cables comprise optical fibers surrounded by strength members and external jacketing with connectors at the ends thereof. The appearance of the fiber optic cables resembles electric shielded cables, such as coaxial cables, but they are smaller in size and lighter in weight. A great deal of effort has been expended in developing connectors for interconnecting fiber optic cables with low loss and low reflection (high return loss).

The prior art teaches various procedures for obtaining low loss and high return loss connections between lengths of optical fibers. One way of doing this is simply to press the ends of the fibers together by means of a connector, for which various designs are known in the art. Thus, the optical fibers are optically coupled together when the ends of the fibers are brought into physical contact with each other. The ends of the fibers should first be prepared by polishing to obtain a more uniform defect-free surface that results in lower signal loss.

Ferrule-type connectors are often used to bring the ends of two optical fibers into physical contact for the purpose of optically coupling them together. For this kind of connector to work successfully, it is required that the optical fibers be flush with or slightly protruding above the mating end faces of the ferrules. Very close tolerances are required to maintain optical contact. Substantial deviations from these conditions tend to result in loss of optical contact and high reflection (or low return loss). Furthermore, any foreign matter, such as dirt, which may be introduced into the gap between the two mating end faces will prevent the optical fibers from being in optical contact with each other.

Heretofore, in order to maintain optical contact, refractive index matching oils or gels have been used to fill the gap between the end faces of the optical fiber containing ferrules. However, such fluids or gels themselves tend to trap foreign matter, particularly when the fibers are unmated for a period of time and then remated, which again may increase losses. Furthermore, such fluids and gels are not very suitable when multiple mate/unmate operations are required.

U.S. Pat. No. 4,221,461 discloses the use of transparent thermoplastic polyurethane materials for coating the ends of optical fibers to reduce coupling losses between lengths of fiber. The coating adheres to the ends of the fibers and is compliant so as to deform elastically when pressed upon making connection with the end of another optical fiber. The coatings are cast onto the ends of the fiber by dissolving the polyurethane materials in a solvent, applying the solution to the fiber ends, and heating to remove the solvent. One of the disadvantages of this procedure is that the coating must be applied to the end faces of fiber under clean conditions to avoid trapping dirt.

U.S. Pat. No. 4,634,214 discloses a ferrule-type connector assembly for optically coupling two lengths of optical fiber. The connector assembly includes a connector plug attached to the end of a fiber optic cable and a connector receptacle which receives two such connector plugs. Each connector plug has a ferrule with a bore through which the optical fiber passes. A pedestal made from an index matching compliant material is located on the end face of the ferrule.

In the system of U.S. Pat. No. 4,634,214 the index matching material in the form of a pedestal is attached to the end face of the ferrule. This system has several disadvantages. The pedestal does not adhere to the ferrule too well. The pedestal has a tendency to become detached from the ferrule. Furthermore, a pedestal must be mounted in a cumbersome procedure on the end of each optical fiber cable which may be inserted into the connector receptacle.

Clearly, it would be much more desirable to have a system wherein an index matching material forms part of the connector receptacle, i.e., wherein an index matching material is located and remains inside a connector receptacle rather than being attached to and travelling with the connector plug at the end of an optical fiber cable.

SUMMARY OF THE INVENTION

Accordingly, the present invention provides an optical fiber connector comprising a connector receptacle, a mechanism associated with the connector receptacle for optically coupling two optical fibers together, and a compliant index matching film material positioned within the connector receptacle. When the optical fibers are inserted into the connector receptacle for optical coupling, the end faces of each of the optical fibers are in physical contact with the film material.

An aspect of the invention is that the connector is of the ferrule type, i.e., the optical fibers are located inside ferrules which are received and aligned within the connector receptacle so that the optical fibers are optically coupled together.

A further aspect of the invention is that a bayonet locking mechanism or other locking mechanism such as a threaded locking mechanism is associated with the connector receptacle and the ferrules for locking the ferrules into place within the connector receptacle.

BRIEF DESCRIPTION OF THE DRAWINGS

The present invention can be described by way of reference to the accompanying drawings in which, FIG. 1 illustrates an optical fiber cable having a plug with a ferrule attached thereto;

FIG. 2 is a cross-sectional view of the plug of FIG. 1;

DETAILED DESCRIPTION OF ILLUSTRATED EMBODIMENT

Figure 3:
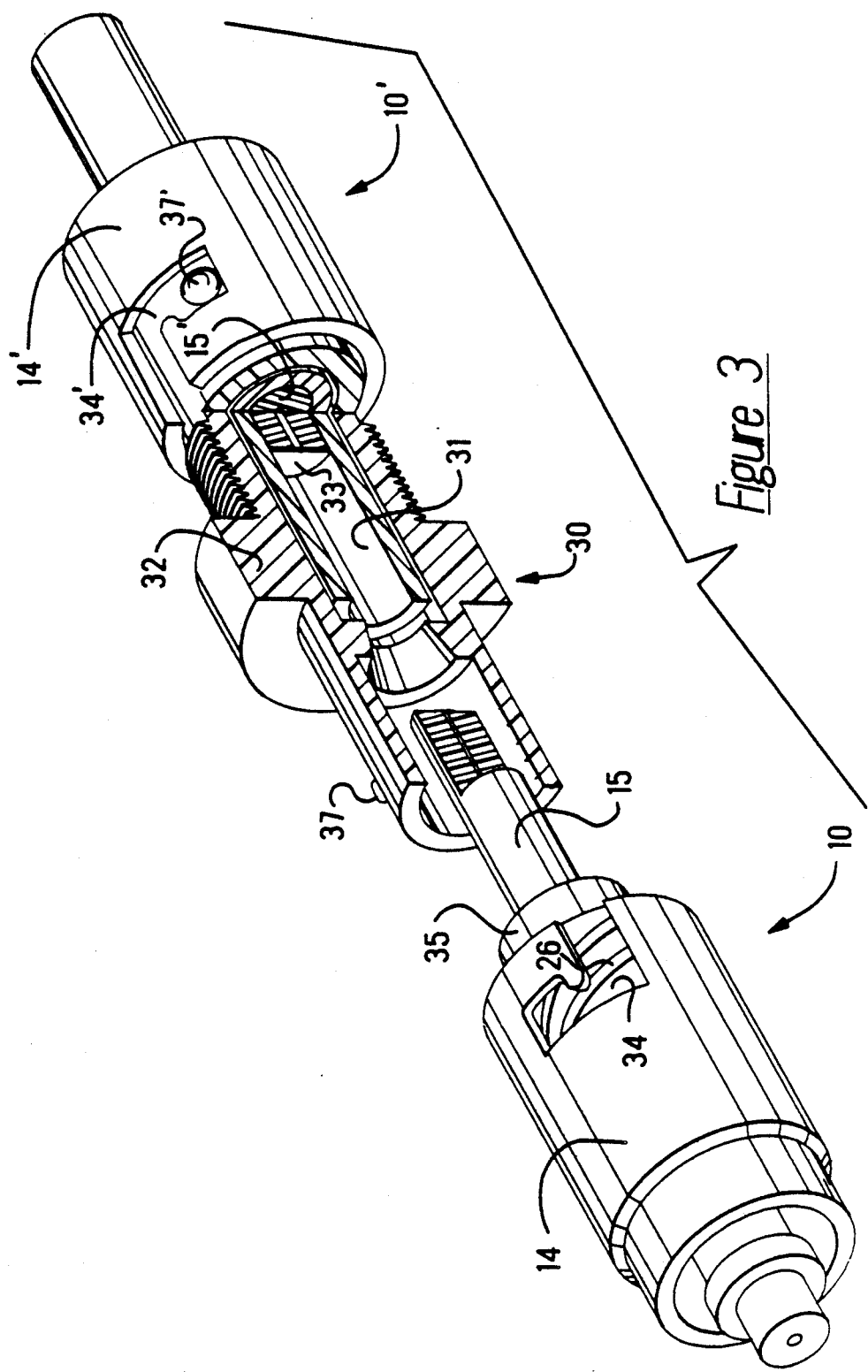
FIG. 3 is a view, partially in cross-section, of a connector assembly including the inventive connector disclosed herein.

FIGS. 1 and 2 show a plug 10 which is attached to the end of an optical fiber cable 11 having an optical fiber 12 therein. Plug 10 includes a connector body 13, a housing 14, and a ferrule 15 which is rigidly attached to the connector body 13. The plug 10 receives optical fiber cable 11 at one end and the optical fiber 12 passes through a bore in the ferrule 15 emerging at end face 16. Housing 14 partially encloses the connector body 13. The ferrule 15 may be formed from any suitable material known to persons of ordinary skill in the art. Ceramic material is preferred since it is rugged and can be relatively inexpensively produced to within close tolerances, and thus can be advantageously used in connectors according to the invention.

FIG. 2 shows the plug 10 in cross-section. Optical fiber cable 11 comprises the optical fiber 12, surrounded by inner jacket 21 (which can comprise one or more different coating layers). Inner jacket 21 is surrounded by a layer of strengthening fibers 22, which layer is in turn enveloped by outer jacket 20. Strengthening fibers 22 may, for example, comprise fibers of KEVLAR. The sleeve 23 (advantageously a stainless steel tube) is a trademark of E. I. DuPont de Nemours & Company, Inc. partially inserted between inner jacket 21 and strengthening fibers 22, with part of sleeve 23 extending beyond the sheathing of optical cable 11. Ferrule 15 is held rigidly in connector body 13 by adhesive means or other appropriate means, e.g., by means of a press fit. Housing 14 is held in place by a retaining ring 28 and spring 26. The empty space 24 between the body 13 and the sleeve 23 may be filled with epoxy 25 in order to form a strong bond between the optical cable 11 and the connector body 13. The adhesive, e.g., a thermosetting epoxy typically is transported along the strengthening fibers 22 by a wicking action, thereby greatly increasing the bonding areas between the sleeve 23 and the strengthening members 22.

In order to secure optical fiber 12 in ferrule 15, an adhesive, typically also a thermosetting epoxy, is injected into the bore of the ferrule 15, followed by threading optical fiber 12 through the bore until the optical fiber cable 11 is positioned substantially as shown in FIGS. 1 and 2. Lightly crimping the connector body 13 near its entrance end 29 preliminarily secures the optical fiber cable 11 in the body 13, and prevents wicking past the crimping region. Following curing of the epoxy, the optical fiber 12 protruding from the end face 16 of ferrule 15 is cut short by any appropriate means, e.g., scribing and breaking, and the fiber end is prepared by polishing or other appropriate means. Methods for fiber end preparation are well known in the art and need not be reviewed. However, it should be noted that the fiber end face may be recessed relative to the end face of the ceramic ferrule, may be flush with the ferrule end face, or protrude from the ferrule end face. A compliant index matching film located within a connector receptacle in accordance with the present invention may be used for all three arrangements.

FIG. 3 shows schematically an exemplary connector receptacle 30 according to the invention. The receptacle 30 receives two plugs 10,10' of the kind previously described, each of plugs 10,10' comprising ferrules 15,15', housings 14,14', springs 26,26' (only one of which is shown), and connector bodies 13,13'. The receptacle 30 includes alignment means 31 within the receptacle housing 32. Alignment means 31 is adapted to receive therein each of the ferrules 15,15' and to maintain them therein in substantially coaxial relationship by keeping aligned the outer cylinder surfaces of the two ferrules 15,15'. Preferably, the alignment means comprises a split sleeve, made from either metal or plastic. Positioned within the alignment means 31 is the index matching film 33. The end faces 16,16' of the ferrules 15,15' from each of the plugs 10,10' press against the film 33 which remains in receptacle housing 32 even after the plugs 10,10' are removed.

As can be seen from FIG. 3, the housings 14,14' of plugs 10,10' include bayonet-type locking mechanisms comprising camming slots 34,34' and camming pins 37,37' (only one of which is shown) which project from the receptacle 30 and are received within slots 34,34' respectively. Since relative rotation of the ferrules 15,15' is undesirable, it is advantageous to provide means for preventing such rotation. This can, for instance, be accomplished by means of keyway pins 35,35' (only one of which is shown) projecting from the connector bodies 13,13' which keyway pins 35,35' are received within keyway slots (not shown) in receptacle housing 32.

Figure 4:
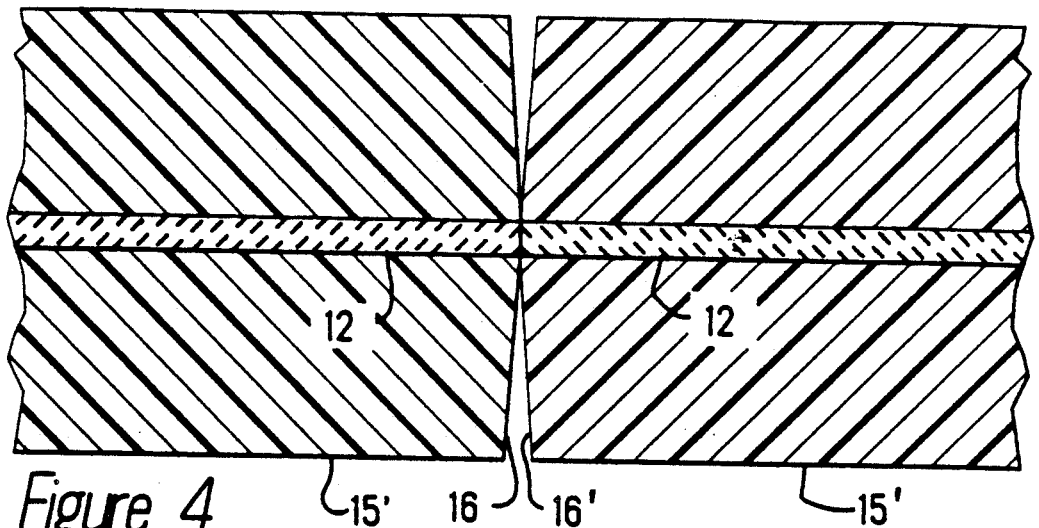
FIGS. 4–6 schematically illustrate the manner in which the inventive connector maintains optical contact even in the presence of dirt.
Figure 5:
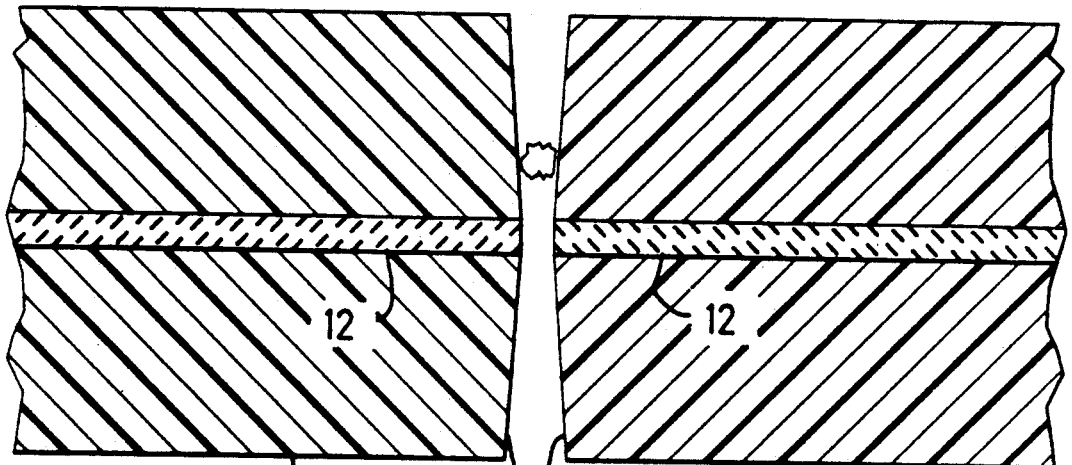
Figure 6:
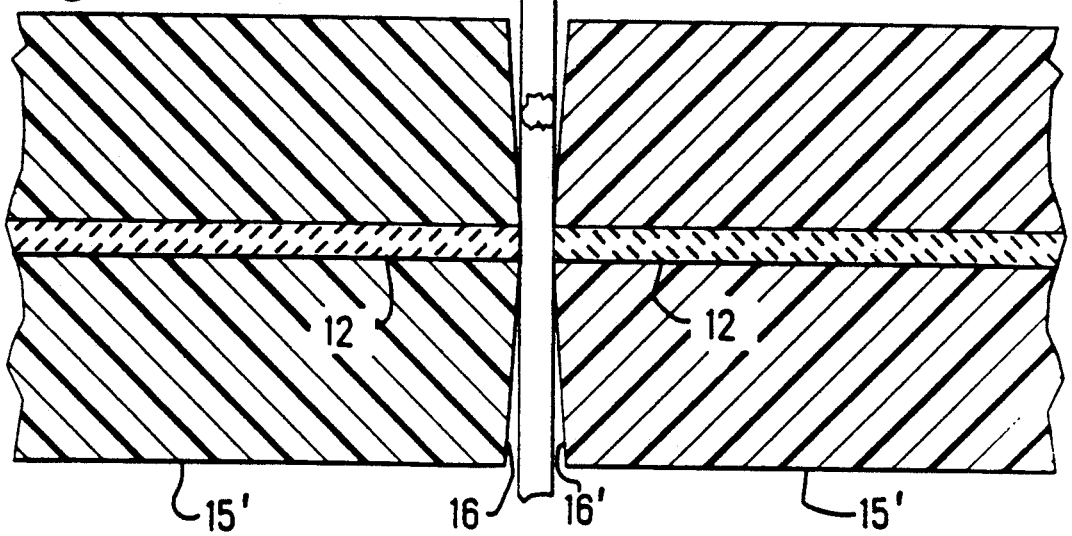

FIGS. 4–6 schematically illustrate the manner in which index matching film 33 reduces the signal loss due to dirt trapped between the end faces 16,16' of ferrules 15,15'. Note that in FIGS. 4–6, the ferrules 15,15' have more rounded end faces 16,16' than those previously illustrated in accordance with more recent connector designs. FIG. 4 shows an ideal contact and low signal loss between the optical fibers 12,12'. No dirt or other foreign matter is trapped between the mating end faces 16,16' of the ferrules 15,15'.

FIG. 5 illustrates what happens when a particle of dirt gets trapped between the end faces 16,16'. The optical fibers 12,12' are prevented from coming into contact with one another leaving an air gap. The glass/air/glass interface results in bad optical coupling and high signal loss. In particular, there are undesired reflections at each glass-air interface.

FIG. 6 illustrates what happens when index matching film 33 is disposed between the end faces 16,16'. Because the film 33 is compliant, it acts to compensate for the presence of dirt. The particle of dirt will embed itself in the film, while the film 33 continues to optically contact the end faces of both optical fibers 12,12'. The glass/film/glass interface is maintained despite the presence of dirt resulting in good optical contact and low signal loss.

Index matching film 33 may be made from a variety of transparent flexible materials. Thus, materials which can form a transparent film and having a modulus of compression between about 104 and 106 psi at 25° C. (as specified in U.S. Pat. No. 4,634,214) may be used. Suitable materials include polyvinylidenechloride. Although different thicknesses of the film may be used, a thicker film (e.g., 4–6 mils) is most suitable. A film of this thickness will support itself within receptacle 30 and no special means are required to retain it in place when plugs 10,10' are removed from receptacle 30.

Figure 6A:
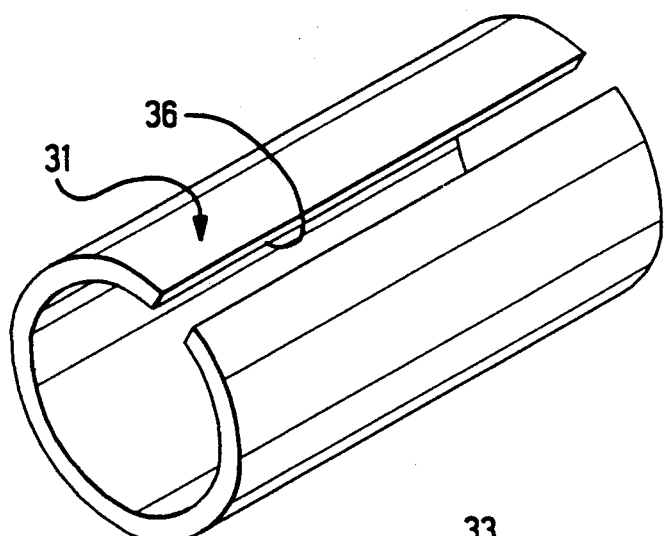
FIG. 6A is a view of a sleeve with open ends and an open seam.
Figure 7:
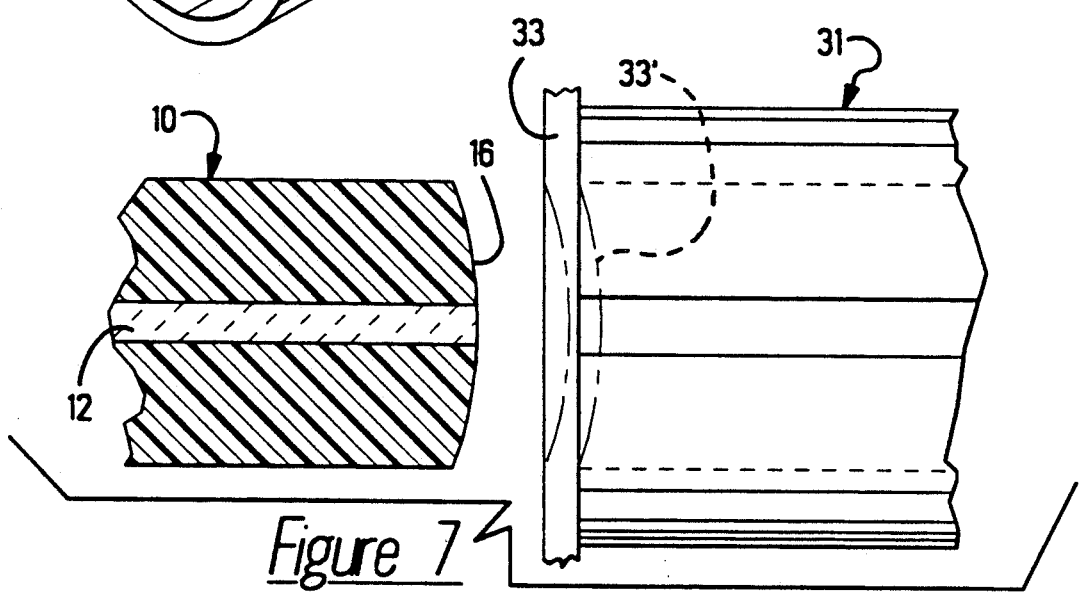
FIGS. 7 and 8 are views illustrating a film with the sleeve illustrated in FIG. 6A.
Figure 8:
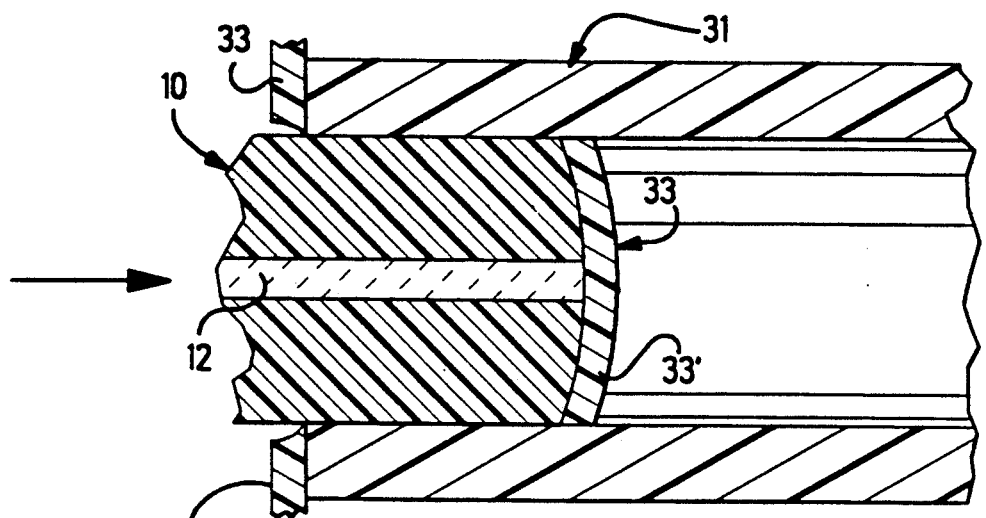

With reference to FIG. 6A, the alignment means 31 is a sleeve 31 with open ends. The diameter of the ferrule 15 or 15' is selected to be at least 1 mm., and in many applications can be 2.5 mm. With reference to FIGS. 7 and 8 the film 33 is held against one of the open ends of the sleeve 31, and a corresponding end face 16 of the ferrule 15 is forcibly engaged against the film 33 causing the film 33 to conform to the shape of the end face 16 of the ferrule 15 and assume a corresponding shape shown in phantom outline at 33' in FIG. 7. The ferrule 15 is then forcibly inserted into the open end of the sleeve 31, causing the film 33 to shear along the cylindrical periphery of the inner diameter of the sleeve 31, and to create a separable part with a sheared cylindrical periphery that frictionally engages and wedges against the inner diameter of the sleeve 31. The ferrule 15 will impel the cylindrical part of the film 33 along the inner diameter until the film 33 is impelled to a desired position along the sleeve 31. Since the film 33 has a thickness of 4-6 mils., the film is not self supporting when stood on its thickness. However, the film 33 is held in position transversely spanning across the inner diameter of the sleeve 31, because the wedged and frictional engagement of the cylindrical periphery of the film 33 with the inner diameter is sufficient to hold the film 33 stationary and self supporting in a spanning position without collapse of the film 33. The ferrule 15 can be withdrawn from the sleeve 31 without dislodging the film 33. Even if the plane of the film 33 is warped when no longer supported by the end face 16 of the ferrule 15, the film 33 will conform to the end face 16 when the ferrule 15 is again inserted into the sleeve 31.

The sleeve 31 can be solid or, as shown in FIG. 6A, having a longitudinal open seam 36. The seam 36 allows the sleeve 31 to expand radially to conform to the diameter of the ferrule 15 that is inserted along the sleeve 31. When the ferrule 15 is withdrawn from such a sleeve 31, the sleeve 31 will contract to a lesser diameter and increase the force against the periphery of the film 33. Even when the sleeve 31 has a discontinuous inner diameter, so long as a substantial portion of the periphery of the film 33 frictionally engages the sleeve 31, the film 33 will be self supporting.

In the optical coupling previously described, a source optical fiber and a receiving optical fiber are separated from each other by a gap. The optical energy emanates from the source fiber and diverges during propagation across the gap. The divergence, along with scattering effects, cause losses in the optical energy that are not coupled into the receiving optical fiber that is across the gap from the source optical fiber. According to the invention, the gap across the coupling is substantially less than the diameter of each optical fiber to lessen the amount of optical energy lost as the optical energy propagates across the gap. More specifically, the gap is determined, first, by the thickness of the film, 4-6 mils., and in most cases, typically less than 6 mils., which is then reduced to the final thickness of the film caused by resilient deformation and/or permanent indentation of the film by direct contact with the abutting source fiber and abutting receiving fiber to a dimension on the order of about no greater than one-half of the fiber diameter, and in many cases less than that. For example, each optical fiber has a diameter of 125–140 microns, nominal dimension, with some optical fibers being constructed with desired diameters as much as 1000 microns. The thickness of the film is reduced to approximately 2 mils or less upon resilient deformation and/or permanent indentation by the source and receiving fibers. In some connectors, such as described in U.S. Pat. No. 4,107,242, a pedestal of transparent material covers an end of a corresponding fiber, and thereby forms an extension of the optical fiber. According to the invention, the film 33 is indented by direct contact with any extension of an optical fiber, such as an extension formed by a pedestal.

An advantage of the invention is that the film 33 can be installed in existing connectors as a retrofitted feature. A further advantage of the invention is that the film 33 is assembled into the sleeve 31 without tools and special mounting structure, and the film 33 can be extracted from the sleeve 31 by compressed air which introduced along the sleeve 31 to dislodge the frictional contact of the film 33 with the sleeve 31, and to collapse the film 33 and expel the film 33 from the sleeve 31.

The index matching film 33 may be positioned within receptacle 30 in a simple manner. All that is required is that the ferrule 15,15' on one of the plugs 10,10' be poked through a web of the film 33 thereby detaching a suitable piece of the film 33. When that plug 10 and a bare plug 10' are both inserted into receptacle 30 via their respective bayonet locking mechanisms, the index matching film 33 is automatically positioned in place between the two ferrules 15,15' creating the glass-/film/glass interface discussed above. When the plugs are removed from receptacle 30, the film 33, particularly if it is about 4-6 mils thick, will remain inside connector receptacle 30. Thereafter, any two plugs adapted to be received within receptacle 30 can be inserted and film 33 will be automatically positioned therebetween.

While the invention has been described by reference to specific embodiments, this was for purposes of illustration only. Numerous alternative embodiments are also within the spirit and scope of the invention.

We claim:

1. An optical fiber connector comprising, a receptacle having a sleeve into which corresponding alignment ferrules are inserted, each of the ferrules aligning a corresponding optical fiber along the sleeve, the improvement comprising;

a film of optically transparent material of a thickness on the order of less than one-half the diameter of each corresponding optical fiber spanning across the interior of the sleeve, a periphery of the film being in frictional engagement with an inner diameter of the sleeve to hold the film stationary and self supporting.

2. An optical fiber connector as recited in claim 1, the improvement comprising; the sleeve has a discontinuous inner diameter.

3. An optical fiber connector as recited in claim 2, the improvement comprising; the film conforms to the shape of one of the ferrules and is impelled to a desired position within the sleeve.

4. An optical fiber connector as recited in claim 2, the improvement comprising; the periphery of the film is sheared.

5. An optical fiber connector as recited in claim 2, the improvement comprising; the film is deformed by direct contact with the ferrules.

6. An optical fiber connector as recited in claim 2, the improvement comprising; the film is in a gap between the optical fibers.

7. An optical fiber connector as recited in claim 2, the improvement comprising; the film is engaged on opposite sides by the optical fibers including any extension of any such optical fibers.

8. An optical fiber connector as recited in claim 1, the improvement comprising; the film conforms to the shape of one of the ferrules and is impelled to a desired position within the sleeve.

9. An optical fiber connector as recited in claim 8, the improvement comprising; the periphery of the film is sheared.

10. An optical fiber connector as recited in claim 8, the improvement comprising; the film is deformed by contact with the ferrules.

11. An optical fiber connector as recited in claim 8, the improvement comprising; the film is in a gap between the optical fibers.

12. An optical fiber connector as recited in claim 8, the improvement comprising; the film is engaged on posite sides by the optical fibers including any extension of any such optical fibers.

13. An optical fiber connector as recited in claim 1, the improvement comprising; the periphery of the film is sheared.

14. An optical fiber connector as recited in claim 5, the improvement comprising; the film is deformed by direct contact with the ferrules.

15. An optical fiber connector as recited in claim 13, the improvement comprising; the film is in a gap between the optical fibers.

16. An optical fiber connector as recited in claim 13, the improvement comprising; the film is engaged on opposite sides by the optical fibers including any extension of any such optical fibers.

17. An optical fiber connector as recited in claim 1, the comprising; the film is deformed by direct contact with the ferrules.

18. An optical fiber connector as recited in claim 17, the improvement comprising; the film is in a gap between the optical fibers.

19. An optical fiber connector as recited in claim 1, the improvement comprising; the film is in a gap between the optical fibers.

20. An optical fiber connector as recited in claim 1, the improvement comprising; the film is engaged on opposite sides by the optical fibers including any extension of any such optical fibers.

* * * * *